Oct. 6, 1959

C. NORTON 2,907,128

SLIDE CHANGER

Filed Nov. 9, 1955

INVENTOR.
Calhoun Norton
BY
Olson & Trexler
Attys.

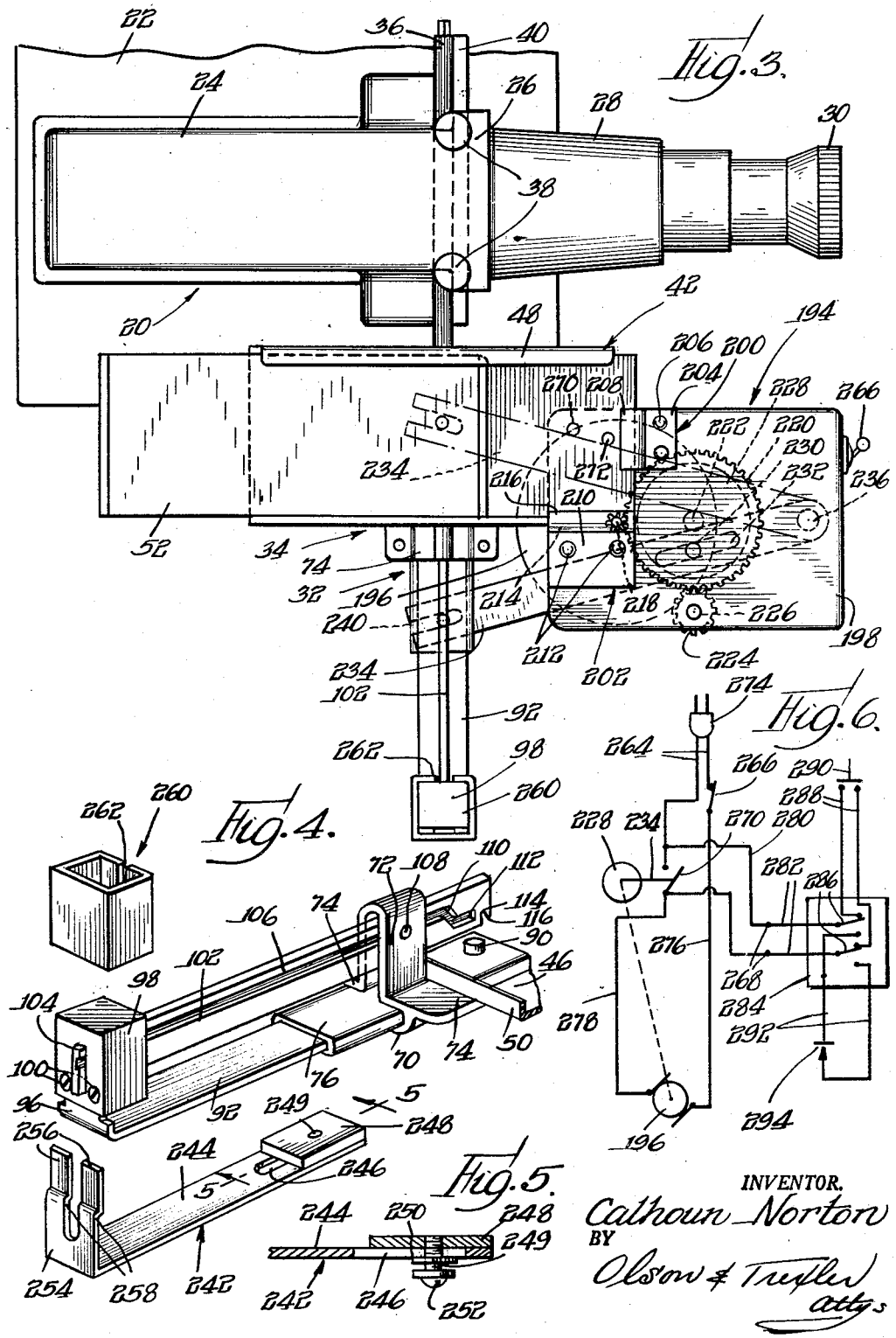

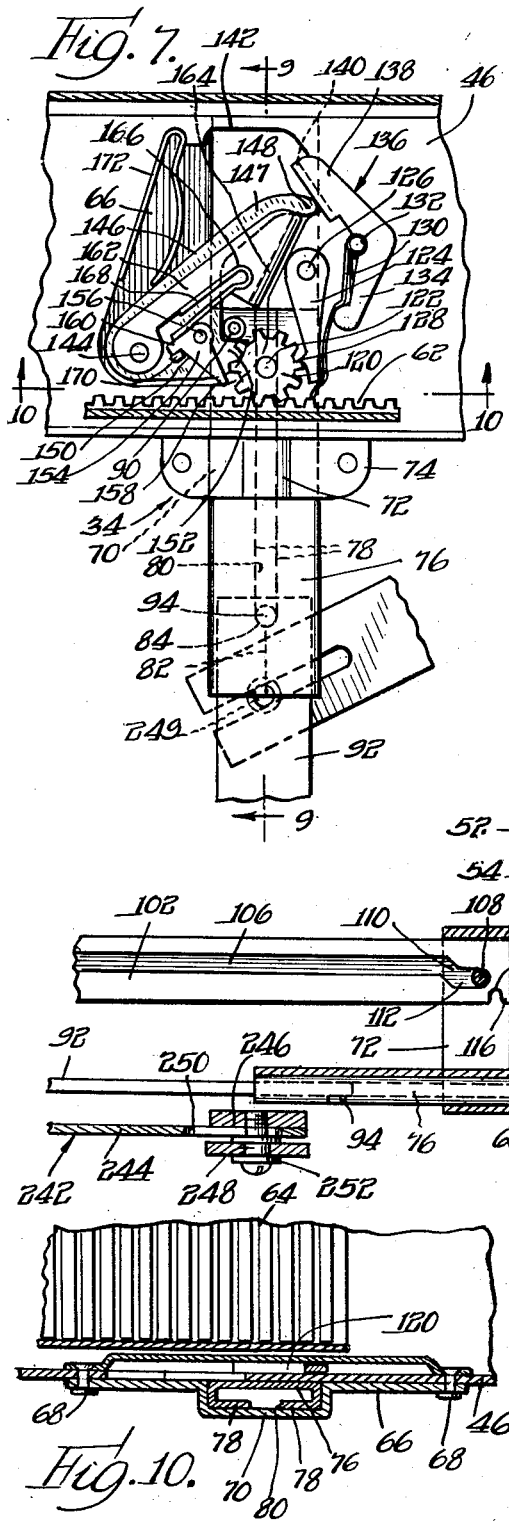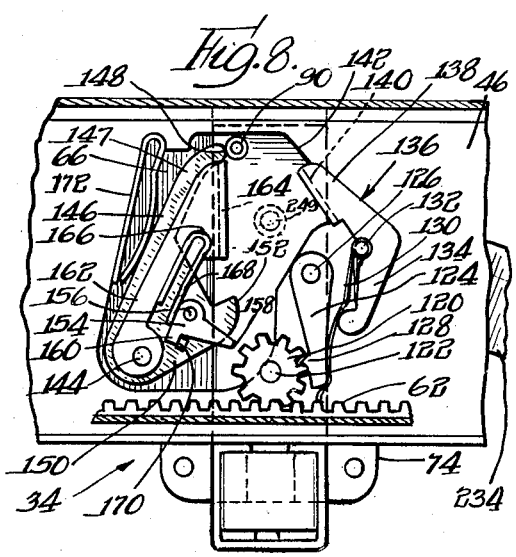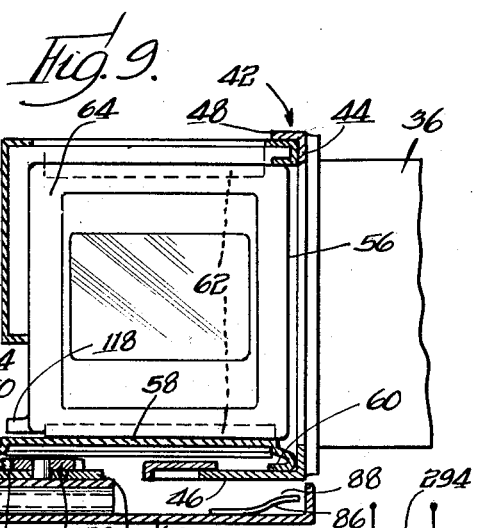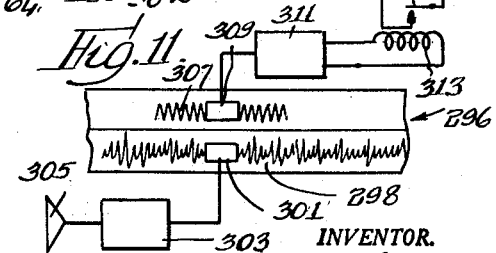

Oct. 6, 1959
C. NORTON
2,907,128
SLIDE CHANGER
Filed Nov. 9, 1955
6 Sheets-Sheet 4
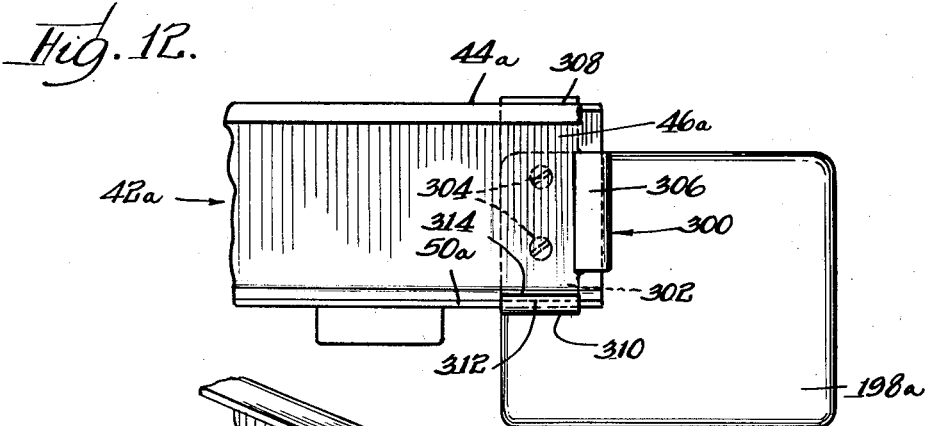
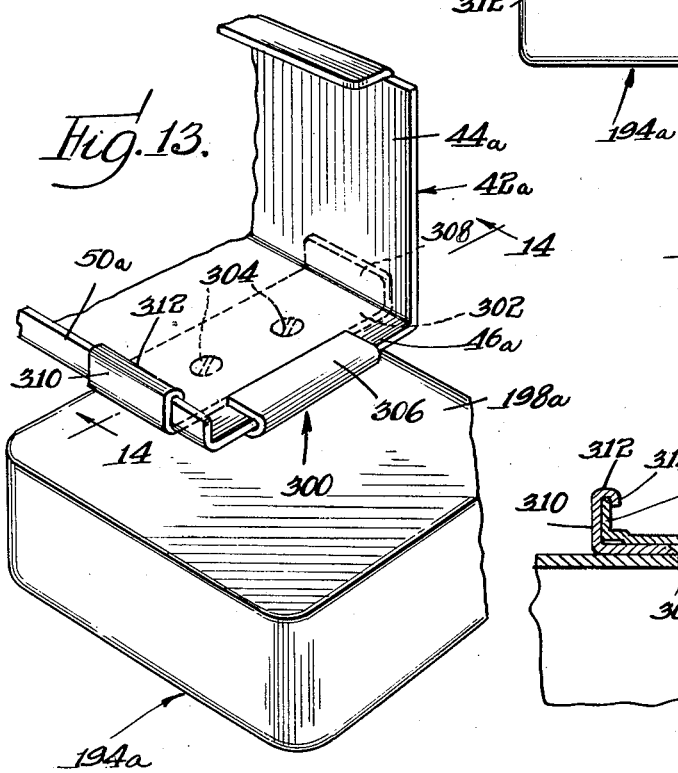
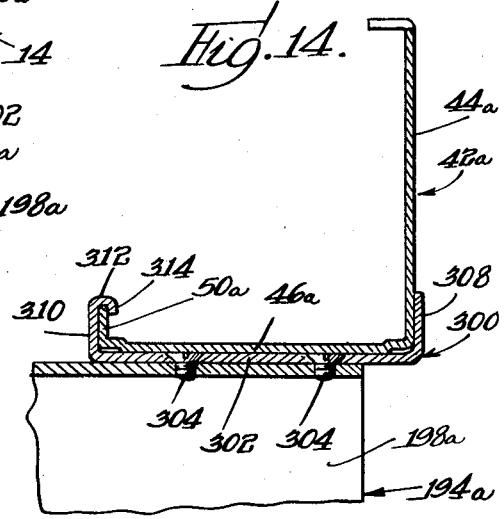
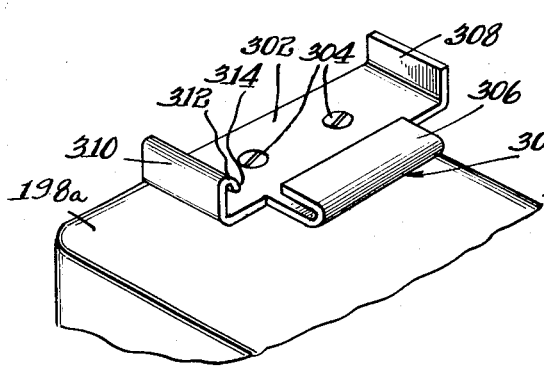
INVENTOR.
Calhoun Norton
BY
Olson & Trexler
Attys.

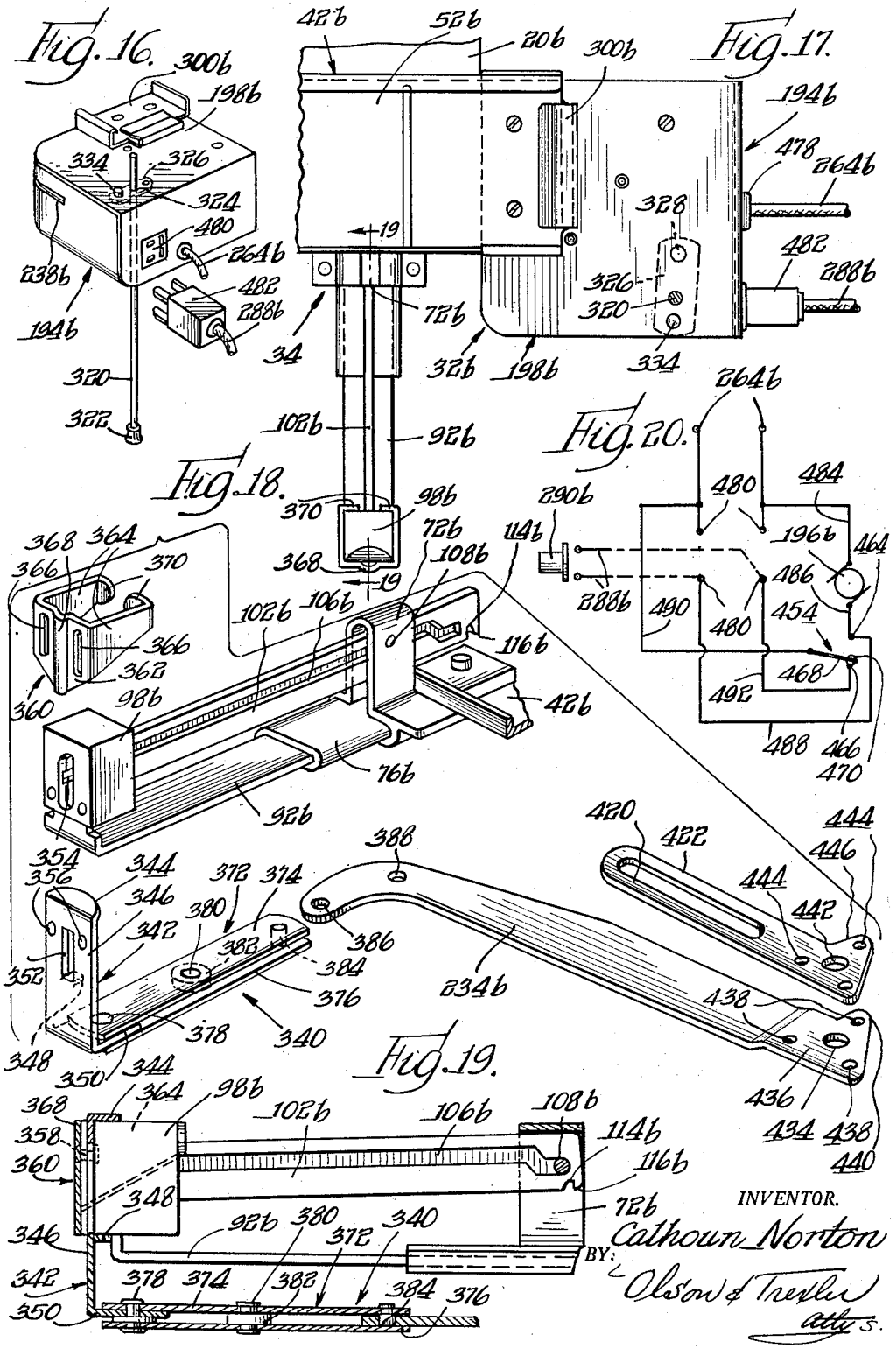

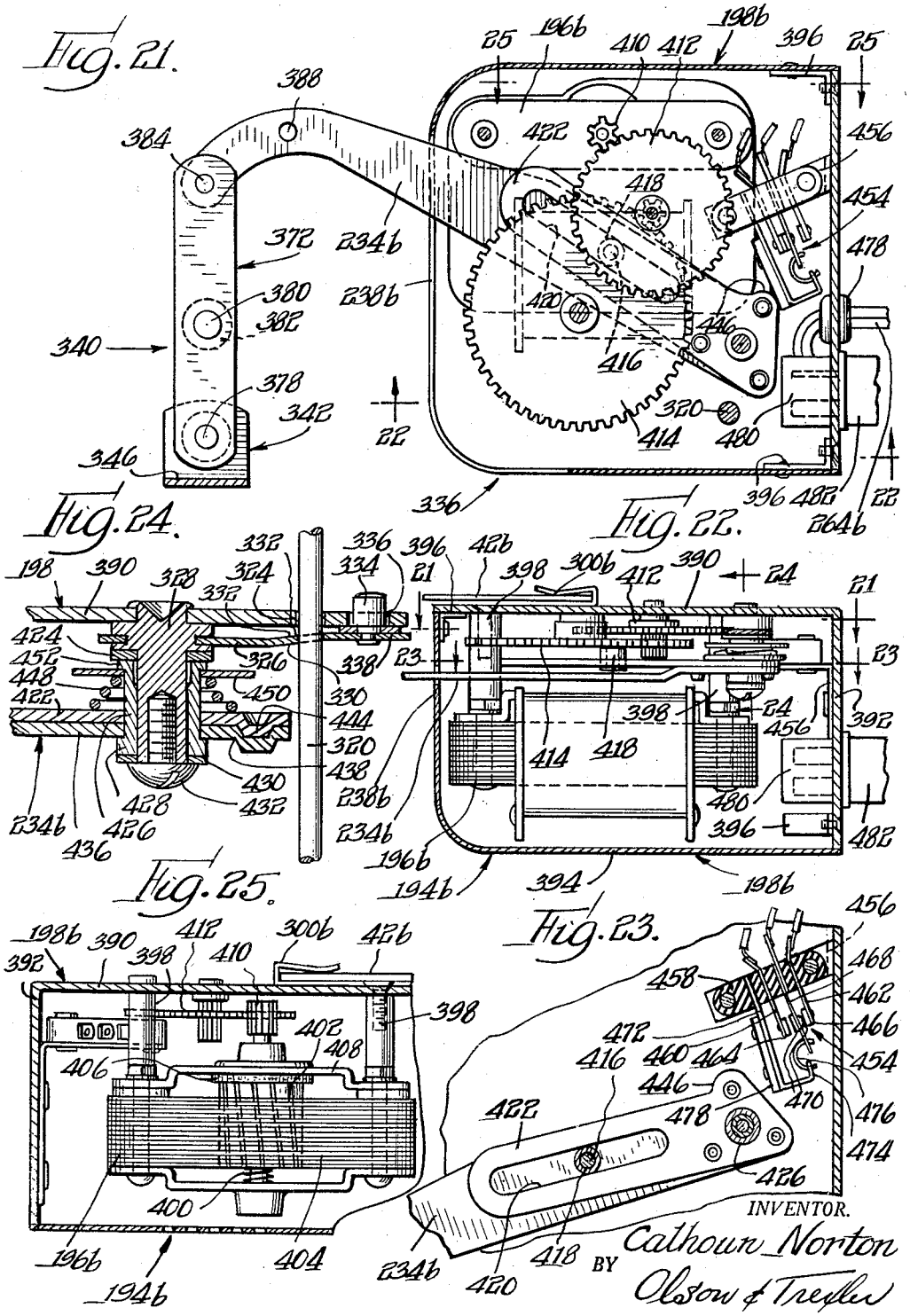

_United States Patent Office_ 2,907,128
Patented Oct. 6, 1959

2,907,128

SLIDE CHANGER

Calhoun Norton, Glenview, Ill.

Application November 9, 1955, Serial No. 545,835

7 Claims. (Cl. 40—36)

This invention is concerned generally with the art of slide projection, and more particularly with apparatus for automatically projecting slides in a predetermined sequence.

In the interest of economy, and also due in part to commercial availability of materials, color photographs for amateurs and other uses have largely been made in small sizes, the double frame 35 mm. being by far the most popular size. Since the pictures are so small, and generally are in the form of transparencies, it has become quite common to mount them as slides and to project them on a screen for viewing. Furthermore, color pictures generally show up to best advantage when projected.

As a result of the widespread acceptance of color slides for projection, an extremely large number of slide projectors is available commercially extending over a wide price range and over an equally wide quality range. The great majority of such projectors require that the slides be inserted and removed individually. This requires a considerable amount of skill on the part of the operator, and often slides will be inserted in improper orientation inasmuch as slide changing must be done in the dark. Furthermore, it requires that the operator be positioned adjacent the projector, which generally is not the most convenient location for him to identify and discuss the scene being projected.

There are a very few automatic slide projectors now on the market in which the slides can be prearranged in a magazine, and the slides then can be projected in sequence from the magazine. However, all of these projectors are of special manufacture. They represent a considerable capital investment, and require complete replacement of prior projectors. From an economic standpoint, this is undesirable. As a result, automatic slide changing has not as yet become generally available to the amateur photographer on a limited budget.

A manually operable, semiautomatic attachment now is available on the photographic market for use with most manual slide projectors. This attachment, made by the Airequipt Manufacturing Company, Inc. of New Rochelle, New York, utilizes a magazine holding slides in face-to-face relation, and is disclosed and claimed in Wiklund U.S. Pat. No. 2,711,602, issued June 28, 1955, and entitled "Slide Changing Means." An operating mechanism is mounted on the side of the slide projector and receives the magazine. A reciprocable control member is provided on the mechanism which is pushed manually in toward the projector to place a slide in projecting position. When this reciprocable control member is manually retracted, the slide is returned to the magazine, and the magazine is advanced one step to bring the next slide into position to be moved by the reciprocable control member into projecting position.

The attachment or mechanism referred to is a step in the right direction, but it still requires a projectionist near the slide projector to actuate the manually operable control member.

Accordingly, it is an object of this invention to provide means operable with substantially any standard projector for projecting slides automatically, as opposed to manually or semiautomatically.

A more specific object of this invention is to provide means for automatically operating a normally semiautomatic slide changing apparatus as outlined above.

Another object of this invention is to provide remotely operable means for automatically projecting slides in substantially any standard projector.

A further object of this invention is to provide means for automatically projecting slides in substantially any standard projector in timed relation with a recorded commentary or the like.

Another object of this invention is to provide a slide projector with an automatic slide changer having a reciprocatory motion and powered by a rotary motor.

A further object of this invention is to provide a slide projector with an automatic slide changer for a replaceable magazine in which slides are automatically moved from the magazine into projecting position, and thereafter returned to the magazine.

It is another object of this invention to provide means for automatically de-energizing the motor when the slide changing or shifting mechanism is stalled by a jammed slide or by engagement with the end of the magazine after all of the slides in a magazine have been shown.

More specifically, it is an object of this invention to provide an automatic slide changer device having a slip clutch whereby the motor may run to complete a cycle for opening a switch to de-energize the motor when the slide shifting or changing mechanism is jammed.

Other objects are to provide an automatically operating device for a slide changer which is adaptable to operate slide changers of different sizes, to provide such a device which has an auxiliary support to avoid tipping a projector with which it is associated, which is readily adaptable for control by a recording device or a voice actuated device, and in which there is substantially no coasting or overrun at the end of a cycle.

Other and further objects and advantages of the present invention will be apparent from the following description when taken in connection with the accompanying drawings wherein:

Fig. 3 is a top view thereof;

Fig. 4 is a perspective view of a part of the automatic slide changing mechanism;

Fig. 5 is a vertical sectional view along the line 5—5 of Fig. 4;

Fig. 6 is a schematic wiring diagram of the automatic slide changing mechanism;

Fig. 7 is a plan view of the slide changing mechanism, certain parts being broken away;

Fig. 8 is a view similar to Fig. 7 with the parts in a different position;

Fig. 9 is a vertical sectional view of the slide changing mechanism taken substantially along the line 9—9 of Fig. 7;

Fig. 10 is a vertical sectional view taken substantially along the line 10—10 in Fig. 7;

Fig. 11 is a schematic diagram of an electronic control for the automatic slide changing mechanism;

Fig. 12 is a fragmentary top view showing a modified mounting structure;

Fig. 13 is a perspective view thereof;

Fig. 14 is a cross sectional view along the line 14—14 of Fig. 13;

Fig. 15 is a perspective view of the modified mounting bracket;

Fig. 16 is a perspective view of a preferred form of the invention;

Fig. 17 is a fragmentary top view similar to a portion of Fig. 3 showing the preferred form of the invention;

Fig. 18 is an exploded perspective view similar to Fig. 4 and showing the preferred form of the invention;

Fig. 19 is a vertical sectional view showing the attachment to the slide changer as taken substantially along the line 19—19 of Fig. 17;

Fig. 20 is a wiring diagram of the preferred form of the invention;

Fig. 21 is a horizontal view partially in section taken just below the top of the cover or case of the mechanism as taken substantially along the line 21—21 of Fig. 22;

Fig. 22 is a vertical view partially in section taken substantially along the line 22—22 of Fig. 21;

Fig. 23 is a fragmentary horizontal view showing the switch mechanism as taken substantially along the line 23—23 of Fig. 22;

Fig. 24 is a longitudinal sectional view through the pivot of the lever mechanism as taken substantially along the line 24—24 in Fig. 22; and Fig. 25 is a fragmentary vertical view partially in section as taken substantially along the line 25—25 of Fig. 21.

Figure 1:
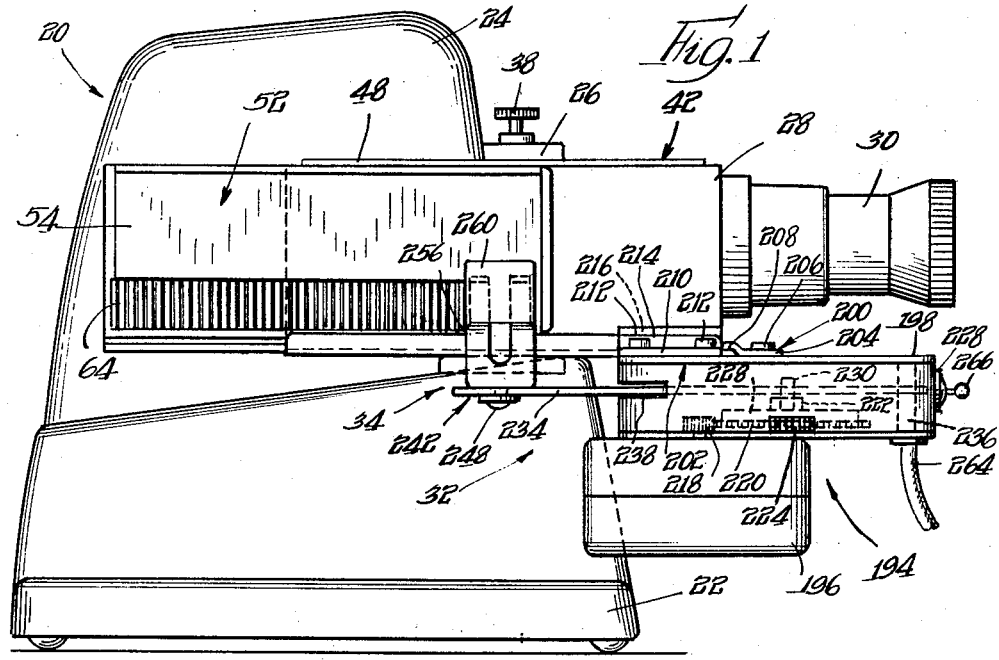
Fig. 1 is a side view of a slide projector equipped with an automatic slide changing mechanism in accordance with the principles of this invention.
Figure 2:
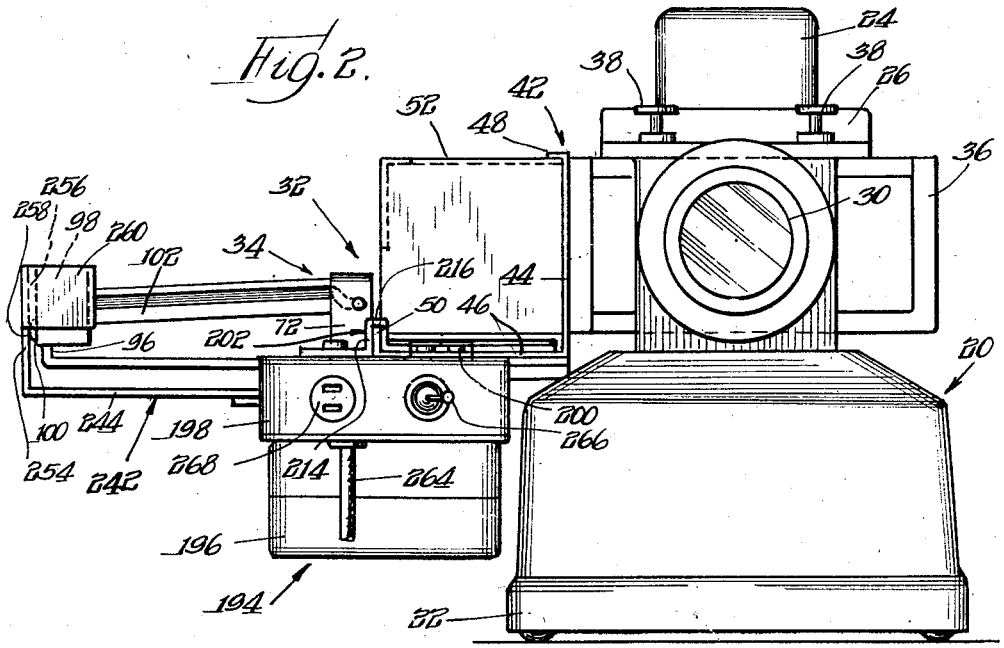
Fig. 2 is a front view of the same.

Referring first to Figs. 1–3, there will be seen a slide projector generally indicated at 20. The slide projector may be of any suitable or known kind and preferably includes a base 22 having a blower therein (not shown) for preventing overheating of the slides. A housing 24 upstands from the base 22, and preferably is adjustable relative thereto for suitably projecting an image on a screen. The housing is provided with a section 26 for positioning slides for projection, and with a tube 28 or the like for adjustably receiving a projecting lens system 30. The housing 24 further includes an electric lamp and a suitable optical system (not shown) for cooperation with the projecting lens system 30 to project the image on the screen.

My automatic slide changing mechanism is identified generally by the numeral 32 and mounts on the side of the projector 20 with a portion of the mechanism received in the projector part 26 wherein the slides are positioned for projection. The automatic slide changing apparatus or mechanism 32 includes a semiautomatic slide changer 34 of the type made by the Airequipt Manufacturing Company, Inc. as previously referred to. This slide changer includes a frame 36 extending through the part 26 of the projector and held in place by means such as set screws 38. The frame 36 includes a replaceable front shell 40 which varies from one projector to another in order to adapt the semiautomatic slide changer 34 to different projectors. The frame 36 also includes a shutter or blind which is spring pressed into closed position to prevent a bright light from being thrown on the screen when no slide is being projected. This shutter or slide being pushed to one side by a slide as a slide is being pushed into position for projection. The details of this mechanism do not form a part of my invention and accordingly are not illustrated.

The semiautomatic slide mechanism further includes an elongated, substantially L-shaped bracket 42 (Figs. 1–3 and 9) having a vertical side wall 44 and a horizontal floor 46. A horizontal flange 48 extends along the top edge of the vertical wall 44, and an upstanding vertical flange 50 extends along the outer edge of the floor 46. The frame 36 is suitably affixed to the vertical side wall 44, and the side wall is provided with a slot aligned with the frame for passing slides through the side wall into the frame.

A magazine 52 of elongated, box-like construction is removably received by the L-shaped bracket 42. The magazine 52 conveniently may be formed of aluminum and is closed at the top and bottom and at both ends. The magazine further is partially closed along one side 54 (Figs. 1 and 9), and is open along the opposite side as indicated at 56. The open side is designed to lie along the vertical side wall 44 of the L-shaped bracket 42, and the magazine is provided with a floor 58 having reversely directed, longitudinal flanges 60 adapted to act as sliding supports for the magazine. One of the flanges 60 is provided with a rack 62 (Figs. 6–9) for cooperation with a cog periodically to advance the magazine as hereinafter will be set forth.

The magazine is provided with transverse guides 62 suitably spaced apart to receive slide holders 64 (Figs. 1 and 9) in vertical position and in face-to-face relation. These slide holders are of any suitable design, and preferably are provided with reversely bent flanges along three sides, and are open along the fourth side for ready receipt of slides.

The semiautomatic slide changer further comprises a plate 66 (Fig. 10) riveted or otherwise secured on the bottom of the plate or bottom 46 as indicated at 68. The plate 66 is formed at its mid section with an integral section or guideway 70 (Figs. 7–10). The guideway and adjacent portions of the plate 66 project outwardly beyond the edge of the plate 46 and the upturned flange 50, and an inverted, narrow, U-shaped guideway 72 (see also Fig. 4) is secured above the channel by means of oppositely outwardly directed feet 74 riveted or otherwise suitably affixed to the projecting portions of the plate 46.

An outer slide 76 is slidably mounted in the guideway 70 and comprises an elongated sheet metal section having the opposite edges folded over into confronting relationship as at 78. The confronting edges 78 are spaced apart throughout the greater part of the length of the outer slide 76 to form a guideway 80. The edges are brought together at 82 adjacent the outer end of the outer slide to close off the guideway 80 and form an end stop 84 therefor.

A leaf spring member 86 is affixed in the guideway 70 adjacent the inner end thereof and has a protuberance 88 for cooperation with a complementary part (not shown) on the outer slide 76 to snap into engagement therewith when the outer slide is moved longitudinally as far as it will go into the channel.

The outer slide 76 is completed by a roller 90 mounted on the top of the outer slide adjacent the inner end thereof.

An inner slide 92 comprising a substantially flat metallic bar is slidably mounted in the outer slide 76, and is provided with a pin 94 projecting downwardly therefrom into the guideway 80 of the outer slide to prevent retraction of the inner slide from the outer slide. The outer end 96 of the inner slide is turned upwardly and a box-like finger piece 98 is secured thereto by means of screws 100 (Fig. 4) having outwardly protruding heads.

A slide changing member 102 in the form of a flat bar disposed in a vertical plane is pivotally anchored at one end in the finger piece 98 by any suitable means (not shown) such as a notch formed in the lower edge of the slide changing member adjacent the rear end thereof and receiving the material at the bottom edge of a vertical slot 104 in the outer wall of the finger piece 98. The slide changing member 102 projects through the inverted U-shaped guideway 72, and is provided with cam groove 106 receiving a guide pin 108 in the guideway 72. The cam groove 106 is straight throughout the greater portion of its length and is positioned near the top edge of the slide changing member 102. The cam groove 106 is angled downwardly at 110 into a straight horizontal section 112 near the inner end of the slide changing member 102.

The inner end of the slide changing member 102 is provided with a notch 114 forming a depending finger 116. Each slide holder 64 is provided with a cup-like projection 118 at its lower, outer corner. When the slide changing member 102 is in its outermost position, it is held in raised position by engagement of the pin 108 in the short horizontal section 112 of the cam track 106. When the slide changing member 102 moves inwardly, the inclined cam section 110, and then the main section 106, cooperate with the pin 108 to drop the finger 116 into the cup 118 of an aligned slide holder to move the slide holder in conjunction with the slide changing member 102. A cog wheel 120 (Figs. 7–10) is rotatably mounted on a pin 122 on the horizontal flange, floor, or plate of the L-shaped bracket 42 for engagement with the rack 62 formed on the magazine 52. A detent 124 is pivotally mounted on a pin 126 on the aforesaid plate 46 and is provided with a symmetrical tooth 128 engageable with the teeth of the cog wheel 120 to restrain the same against rotation. A leaf spring 130 is looped about a fixed pin 132 on the plate 46 and bears against the detent 124 and against one arm 134 to urge the tooth 128 into engagement with the cog wheel 120. The opposite arm 138 of the bell crank is provided with a down-turned flange 140 which depends into a notch forming a part of an irregular hole or opening 142 in the plate 46. Engagement of the flange 140 in the notch allows limited pivotal movement of the bell crank 136, but prevents movement beyond a certain degree so that the spring 130 properly may bias the detent 134.

Within the irregular hole or opening 142, and on the plate 66 riveted to the bottom of the plate 46 there is provided a pivot pin 144. A lever 146 is pivotally mounted on the pin 144 and has an extending finger 147 with a rounded nose 148 adapted to contact the depending flange 140 of the bell crank 136 to stop the lever in rest position as shown in Fig. 7 and also to rotate the bell crank slightly in a clockwise direction in order to increase the tension on the spring 130.

The lever 146 further is provided with a shelf portion 150 having a projecting tooth 152 engageable with the roller 90 on the outer slide 76 to pivot the lever in a clockwise direction to the position shown in Fig. 7. The roller is engageable with the finger 147 to pivot the lever in a counterclockwise direction to the position shown in Fig. 8.

A pawl 154 is pivoted on the shelf 150 at 156 and is provided with a nose 158 engageable with the cog wheel 120 as a ratchet, and with a tail 160.

A follower lever 162 is pivotally mounted on the pin 144 above the lever 146 and is provided with a down-turned flange 164 adjacent its outer end. The follower lever also is provided with a keyhole-like slot 166 receiving the complementary bight of a leaf spring 168 bearing against the lever 162 and against the pawl 154 adjacent the tail thereof. A stop 170 is struck up from the shelf 150 of the lever 146 to engage the tail 160 to limit counterclockwise movement of the pawl.

A leaf spring 172 fits in a complementary portion of the irregularly shaped hole or opening 142 and bears against the lever 146 to bias it in a clockwise direction.

If the finger piece 98 were to be grasped and moved manually toward the projector 20, the slide changing member 102 would engage the cup 118 of an aligned slide holder as previously mentioned to move the slide held thereby into projecting position. At the same time as the member 102 moves inwardly, the inner slide 92 telescopes with the outer slide 76 until the upturned end portion 96 engages the outer end of the outer slide to move the outer slide in toward the projector. Such movement of the outer slide causes the roller 90 to engage the arm 147 of the lever 146 to move it to the position shown in Fig. 8, the follower lever 162 moving with the lever 146 due to the spring 168, and the pawl 154 also moving to the position shown in Fig. 8. Upon withdrawal of the slide changing member 102 and slides 92 and 76, the slide changing member returns the slide-holder 64 to its original position, and the finger 116 is removed from the cup 118 by the pin 108 acting through the sections 110 and 112 of the cam track. The inner slide 92 slides outwardly in the outer slide 76 until the pin 94 thereon engages the stop 84 of the outer slide, at which time the outer slide is withdrawn. Upon such withdrawal, the roller 80 rides along the outer surface of the flange 164 to hold back the follower lever 162. The outer end of the flange 164 holds back the lever 146.

When the roller 80 leaves the inner end of the flange 164, the spring 172 force the levers 146 and 162 in a clockwise direction from the position shown in Fig. 8 to the position shown in Fig. 7, engagement of the nose 148 with the flange 140 of the bell crank 136 providing a resilient stop. Such clockwise pivotal movement causes the nose 158 of the pawl 154 to engage one of the cog teeth of the cog wheel 120 to rotate the cog wheel the distance between two teeth, and thereby to advance the magazine 52 through the rack 62 to bring the next slide holder into position for transverse movement to project the next slide. It will be observed that the pawl 154 stops in both of its limited positions of movement as shown in Figs. 7 and 8 with the pawl out of engagement with the cog wheel 120. Accordingly, when the slide changing member 102 is withdrawn, the magazine may be moved manually for insertion or withdrawal, or for adjustment, and the cog wheel during such movement simply ratchets past the tooth 128 of the detent 124.

The attachment or mechanism for automatically operating the foregoing parts is indicated at 194 in Figs. 1, 2, and 3. This mechanism includes a small electric motor 196 mounted on the bottom of a gear housing 198. The gear housing is provided on its top surface with a pair of brackets respectively indicated at 200 and 202. The bracket 200 includes a flange 204 which is riveted or otherwise suitably secured to the top surface of the gear housing as indicated at 206 in Figs. 1 and 3. This bracket further includes an upwardly offset flange 208 which is substantially parallel to the flange 204 and which is spaced therefrom a sufficient distance frictionally to grip the edge of the horizontal flange or plate 46 of the L-shaped bracket 42 between it and the top surface of the gear housing.

The second bracket 202 also includes a horizontal flange 210 which is secured by means such as rivets or screws 212 to the top of the gear housing 198. A vertical web 214 of the bracket 202 (Figs. 1–3) is adapted to lie along the vertical flange 50 of the bracket 42, and a flange 216 parallel to the attaching flange 210 is adapted to overlie the top of the flange 50. Thus it will be seen that the two brackets 200 and 202 frictionally and detachably mount the attachment or mechanism 194 on the semiautomatic slide changer 34.

The gear housing 198 includes reduction gears driven by the motor 196, and for exemplary purposes the reduction gears may be taken as including a small pinion 218 on the motor drive shaft meshing with a large gear 220 rotatably mounted on a shaft 222 secured to the bottom of the gear housing 198. A manually manipulatable gear 224 may be provided rotatably mounted in the housing on a shaft 226 and extending through the side of the housing, said gear being in mesh with the large gear 220. The gear 224 conveniently may be made of fiber or a plastic such as nylon to provide smooth running and to avoid injury to the fingers when manually manipulated for purposes hereinafter to be disclosed.

A fly wheel 228 is mounted on the shaft 222 and is fixed for rotation with the gear 220. An eccentric pin 230 extends upwardly from the fly wheel 228 and is received in an elongated slot 232 in a wigwag or actuating arm 234 which is pivotally mounted at its inner end on a post 236 near the front end of the gear housing 198. The actuating arm 234 extends outwardly from the rear end of the gear housing 198 through a slot 238 (Fig. 1) and is provided at its outer end with a slot 240 (Fig. 3).

A substantially L-shaped bracket 242 (Figs. 1, 2, 4, 5, and 9) interconnects the actuating arm 234 and the semiautomatic changer 34. This substantially L-shaped bracket comprises a bar-like section 244 which is provided adjacent its inner end with an elongated slot 246 adjustably receiving a pivot pin 249 which is threaded into a flat block 248 lying on top of a bar 244. A clamping nut 250 locks the pin in adjusted position, and the pin fits in the slot 240 of the actuating arm 234, the pin being provided with a large head 252 underlying the actuating arm 234.

The bracket 242 further is provided with an upstanding flange 254 on its outer end, this flange being bifurcated to provide a pair of arms 256 (Figs. 1, 2, and 4) adapted to lie on opposite sides of the protruding outer end of the slide changing member 102. The upper ends of the arms 256 are offset inwardly to provide shoulder portions 258 which are designed to engage above the screw heads 100 on the finger piece 98.

A resilient, box-like clamp 260 (Figs. 1-4) is adapted to fit over the upper portions of the legs 256 and around the finger piece 98, the clamp 260 being provided along one face with a slot 262 to provide clearance for the slide changing member 102 and to impart resilient gripping of the legs 256 and finger piece 98.

Representations of various electrical elements are shown in the drawings, some of them in somewhat schematic form, and these electrical elements include a power cord 264 (Figs. 1 and 2) extending from the gear housing 198 and an on-off switch 266 on the end of the gear housing. A small socket 268 (Fig. 2) is mounted in the end of the gear housing adjacent the switch 266. A limit switch 270 (Fig. 3) is provided in the gear housing 198 and normally is held open by the actuating arm 234 when the actuating arm lies against a fixed stop 272 which also is carried within the gear housing 198.

The purpose of the electrical elements just outlined will be more clearly understood upon reference to the schematic wiring diagram of Fig. 6. The power cord 264 is provided with a conventional plug 274. One wire of the line leads to the switch 266, and a wire 276 leads from the switch 266 to the electric motor 196. The other wire of the power line or cord 264 leads to the limit switch 270, and a wire 278 leads from the limit switch to the motor 196. The limit switch 270 is normally held open by the actuating arm 234 which is represented in Fig. 6 in a very diagrammatic manner, the gear train connecting the motor 196 and the fly wheel 228 being indicated only by a dashed line. The contacts of the small socket 268 are connected in parallel across the limit switch 270 by a pair of wires 280. This socket is adapted to be connected by a plug and a pair of wires 282 to a switch box 284. This switch box includes a double pole, double throw switch 286 for alternatively connecting a pair of wires 288 leading to a push button switch 290, or a pair of wires 292 leading to a relay contact 294 to the wires 282.

Assuming that the switch 286 in the switch box 284 is in the proper position to connect the push button switch 290 to the wires 282 as illustrated in Fig. 6, it will be seen that momentary closing of the push button switch 290 (the line switch 266 being closed) will energize the motor 196. Rotation of the motor acts through the gear train to rotate the fly wheel 228. This causes the actuating arm 234 to move through the pin-in-slot connection 230, 232 to close the limit switch 270 which acts as a holding switch when the push button 290 is released. The motor then runs until the fly wheel 228 and actuating arm 234 have moved through a complete cycle from the dashed line position shown in Fig. 3, to the solid line position shown in Fig. 3 and back nearly to the initial position at which point the arm engages the limit switch 270 to open the same. The arm opens the limit switch shortly before the pin-in-slot connection reaches a dead center, and inertia continues such movement to bring the arm 234 against the stop 272, the parts stopping in a dead center position.

It will be appreciated that movement of the actuating arm through the cycle outlined above causes the finger piece 98 to be moved outwardly by the L-shaped bracket 242, and then to be pushed back in toward the projector for automatic operation of the semiautomatic slide changer. Operation of the semiautomatic slide changer during such automatic actuation remains as previously outlined.

Automatic operation as instituted by the push button 290 allows an operator or projectionist to be located remotely of the projector, inasmuch as the wires 288 leading to the push button can be made of any desirable length. The operator or projectionist can be dispensed with entirely in accordance with the principles of my invention when a recorded commentary or the like is to accomplish projection of the slides. This is done by moving the switch 286 in the switch box 284 to bring the relay contacts 294 into the circuit in place of the push button contact 290. The relay contact 294 can be operated from a record in any desired manner, and a satisfactory means for accomplishing such operation is shown in Fig. 11. In Fig. 11, a tape 296 has been utilized to record the commentary. The commentary is recorded along one side of the tape as indicated at 298, and a pick-up 301 is provided for cooperation with this part of the tape. The pick-up 301 is connected to an amplifier 303 which feeds a loudspeaker 305 for rendering the recorded commentary audible.

The opposite side of the tape 296 is utilized to record a code signal 307 at intervals whenever it is desired to change slides. A separate pick-up 309 is provided for cooperation with the code signal 307, which may simply be a 1,000 cycle signal, and this pick-up is connected to an amplifier 311 which is designed to energize a relay coil 313 for momentarily closing the relay contacts 294. Operation of the apparatus is similar to operation by the push button, except that the operator or projectionist can be dispensed with as previously indicated.

It will be understood that the foregoing means set forth for operating a relay are illustrative only, and that other means could be used including a voice relay which would hold the relay switch open as long as there was a sound signal on the record, or a frequency sensitive relay and a corresponding code signal on the record, or a supersonic or subsonic signal on the record cooperating with suitable operating means.

As will be apparent from the foregoing description of operation, the parts normally are in a rest position as indicated in the dashed line position of Fig. 3 with the slides 76 and 92 and the slide changing member in inserted position. Obviously, a magazine cannot be removed or installed with the parts in this position. The actuating arm 234 stops in a dead center position relative to the fly wheel 228 as previously indicated, so the arm cannot be withdrawn manually. Accordingly, when it is desired to remove or insert a magazine, the fiber or plastic gear 224 is operated manually to run the apparatus or mechanism through a half cycle, and thereby to withdraw the slides and actuating member to the position shown in Fig. 3. It will be understood that the gear 224 could comprise a knurled wheel or the like of large diameter placed on the shaft 222 and fixed for rotation with the fly wheel 228, or the gear 220 could be sufficiently large or properly placed to extend through the side of the gear housing. It will be understood that the line switch 266 would be open during such operation to prevent running of the motor. It would be possible to omit such manual operation of the gear train and to remove the clip 260 from the arms 256 and finger piece 98 for manual retraction or withdrawal of the finger piece, but it is preferred to have a gear or the like extending from the gear housing for manual operation of the gear train.

In many instances it is highly desirable to attach the power mechanism of the slide changing apparatus in such manner that it can be quickly removed for transportation and as quickly replaced for use without the necessity of any tools and without any possibility of maladjustment. A modified supporting structure particularly adapted for such use is shown in Figs. 12–15. Similar parts in these figures are identified by the same numerals used heretofore with the addition of the suffix a.

The automatic operating attachment or mechanism is substantially identical with that previously described and is shown only fragmentarily, being identified by the numeral 194a. This attachment or mechanism includes the gear housing 198a, and the motor therebeneath (not shown) and the actuating arm (not shown) projecting from the gear housing.

The modification resides in the attaching or supporting structure comprising a bracket 300. This bracket is of unitary heavy sheet metal construction, and includes a base plate 302 held flat against the top of the motor housing 198a by means such as a pair of bevel headed screws 304 countersunk into the base plate 302 and threaded into the top of the motor housing.

The base plate is provided along one edge with a reversely bent tongue 306 parallel to and overlying the base plate. This tongue is adapted to lie on top of the horizontal floor 46a of the L-shaped bracket 42a with the base plate 302 bearing against the under side of the floor 46a.

A flange 308 extends upwardly at right angles from one edge of the base plate 302 and is adapted to lie along the outer surface of the vertical side wall 44a of the L-shaped bracket 42a. A flange 310 upstands from the opposite edge of the base plate in parallelism with the flange 308 and is adapted to lie along the outer surface of the opposite flange 50a of the L-shaped bracket 42a. The upper edge of the flange 310 is curled over to lie on top of the edge of the flange 50a as at 312 and to lie along the inner edge of the flange 50a as at 314.

It will be apparent from the foregoing description and from the drawings that the bracket 300 readily can be slipped on or off the front edge of the L-shaped bracket 42a. The bracket 300 grips the L-shaped bracket 42a on three sides, as well as on the top and bottom, thus firmly but removably to support the automatic operating mechanism or attachment.

A refined, and therefore preferred, form of the invention is shown in Figs. 16–25. Many of the parts in these figures are identical to, or are at least analogous to, parts heretofore described. Therefore, in order to obviate the necessity of detailed description and accompanying prolixity, such parts are identified by numerals similar to those heretofore used with the addition of the suffix b.

More specifically, the slide projector 20b remains identical with the slide projector heretofore shown and described. The semiautomatic slide changer 34b also remains the same as previously shown and described, being attached to the projector in the same manner as heretofore described, and including the L-shaped bracket 42b removably carrying the magazine 52b. The semiautomatic slide changer again includes an inverted, narrow, U-shaped guideway 72b and an outer slide 76b.

The semiautomatic slide changer again includes an inner slide 92b in the form of a flat metal bar slidably mounted in the outer slide 76b. A box-like finger piece 98b again is provided on the outer end of the inner slide.

A slide changing member 102b in the form of a flat bar disposed in a vertical plane is pivotally anchored at one end in the finger piece 98b by any suitable means (not shown). The slide changing member 102b projects through the inverted U-shaped guideway 72b and is provided with a cam groove 106b receiving a guide pin 108b in the guideway 72b. This came groove is shaped similarly to the cam groove previously described, and for the same purpose. The slide changing member again is provided near its lower front corner with a notch 114b forming a depending finger 116b adapted for cooperation with the respective slide holders in the magazine 52b.

The attachment or mechanism for automatically operating the parts of the semiautomatic slide changer is identified by the numeral 194b, and includes a small electric motor 196b mounted within a housing 198b. The housing 198b and associated parts are supported from the L-shaped bracket 42b of the semiautomatic slide changer by means of a bracket 300b similar to the bracket 300 previously described. Some slide projectors have rather narrow bases, and there thus is a possibility that the weight of the semiautomatic changer and the automatically operating mechanism might tend to tip the assemblage. Therefore, additional means is provided for supporting the automatic mechanism from the table or the like on which the projector rests.

The additional or auxiliary supporting mechanism comprises a metal rod 320 (Figs. 16 and 24). The rod conveniently is made of aluminum, but may be made of other metals, and is provided at the lower end with a rubber or other relatively soft tip or foot 322. The rod projects through aligned apertures 324 in the top and bottom of the housing 198b. A spring metal tongue 326 is secured adjacent the apertures 324 on a stud 328 connected to the top of the housing 198b by having the outer or upper end of the stud swaged outwardly. The tongue 326 is provided with a diagonal portion 330 aligned with the apertures 324, and an aperture 332 is provided in the tongue in alignment with the aperture 324. A push button 334, conveniently made of plastic, projects through an opening 336 in the top of the housing and is cooperable with the outer end 338 of the spring tongue. The button 334 may be attached to the outer end 338, or simply may bear against the top surface thereof.

The relative orientation of the two apertures 324 and the aperture 332, combined with the inclination of the section 330 of the tongue, cooperate to wedge the rod 320 against the upper edge of the aperture 332 in response to relatively upward forces on the rod 320. On the other hand, the rod may be moved downwardly relatively freely, and the rod may be freed substantially completely for up or down movement by depressing the button 334. The rod therefore can be adjusted vertically without difficulty so that the tip or foot 322 will bear on the supporting table or the like to provide support for the automatic operating mechanism in addition to the support provided by the bracket 300b.

An actuating arm 234b extends from the housing 198b through a horizontal slot 238b, and is connected to the finger piece 98b of the inner slide 92b and the slide changing member 102b by means of a novel structure hereinafter set forth. More specifically, this structure, generally identified by the numeral 340, includes a generally L-shaped fitting 342. The fitting 342 includes a bent over upper tip or finger 344 adapted to lie against the top of the finger piece 98b, and a vertical portion 346 adapted to lie against the end of the finger piece. The vertical portion is provided with an inwardly struck out finger 348 adapted to underlie the finger piece 98b. A horizontal flange 350 is provided on the fitting 342 and is adapted for connection to an interconnecting link as will be set forth hereinafter.

The vertical portion 346 of the fitting 342 is provided above the struck out finger 348 with a vertically elongated slot 352 adapted to accommodate a projection 354 of the slide changing member 102b. A pair of apertures 356 is spaced on opposite sides of the slot 352 adjacent the top thereof, and rivets 358 are mounted in these apertures with the heads of the rivets spaced from the fitting 342.

A generally U-shaped attachment bracket 360 having a web 362 and side flanges 364 is provided in the web with vertically elongated slots 366 receiving the rivets 358, whereby the bracket 360 is held on the fitting 342 for vertical movement relative thereto. The web also is provided with a vertical rib 368 which provides clearance for the projection 354 of the slide changing member, and inwardly directed tips or flanges 370 are provided on the outer ends of the flanges 364. It will be observed that the bracket 360 is formed from a triangular blank, and that the maximum height of the bracket is along the rib 368, the height diminishing steadily therefrom moving outwardly on the web, along the flanges 364, and along the flanges or tips 370, the latter being provided with curved confronting edges.

A link 372 is provided for attaching the fitting 342 to the actuating arm 234b. This link comprises a flat metal bar 374 of generally rigid nature, and a spring steel strip 376 of similar configuration. The bar 374 and spring 376 are joined together and are pivotally connected to the flange 350 of the fitting 342 by means of a rivet or the like 378. The bar and spring strip also are connected by an intermediate rivet 380, a spacer 382 being interposed between the bar and strip and held in place by the rivet 380. At the end of the link opposite to the pivotally mounting rivet 378 there is provided a pin 384 which is fixed to the bar by means such as a reduced end of the pin fitting through a hole in the bar and peened over. The pin 384 is not affixed to the spring strip 376.

The end of the actuating arm 234b is curved outwardly toward the link 372. The tip of the arm is provided with an aperture 386, and another aperture 388 is provided substantially at the position where the arm starts to curve. The pin is received in either of these apertures, and is associated with the appropriate aperture by bending the tip of the spring strip 376 down to allow insertion of the tip of the actuating arm between the pin 384 and the spring strip 376. Upon entry of the pin into one of the apertures the spring strip holds the pin properly in place.

There are two different sizes of semiautomatic changer of the type here under consideration. The two semiautomatic changers are substantially identical, but are made to fit projectors of different sizes, and accordingly the semiautomatic changers have two different distances of reciprocation. The two holes or apertures 386 and 388 are provided for adaption to either size of semiautomatic changer, and the apertures are appropriately labeled with the model number of the two respective sizes of semiautomatic changer.

The top 390 (Figs. 22 and 25) of the housing 198b, and one end 392 thereof are formed as a single sheet of rather heavy sheet steel. The remainder of the housing comprises a light weight cover 394 conveniently stamped of aluminum, and held to the top 390 and end 392 by means of screws and angle brackets 396, the angle brackets being appropriately riveted or otherwise secured to the top and end, or to the cover. The electric motor 196b is secured to the top 390 by means of suitable screws or bolts and posts 398 in more or less conventional fashion. The motor is of a type commercially available wherein a spring 400 (Fig. 25) presses the rotor or armature 402 out of alignment with the stator 404 and into engagement with a friction washer 406 to press this washer against a part of the frame 408 of the motor. When the motor is energized the magnetic action thereof centralizes the rotor 402 in the stator 404, shifting the rotor endwise against the spring and moving the rotor out of frictional engagement with the disc or washer 406. When the motor is de-energized the spring forces the rotor against the friction washer or disc, and the rotor therefore is braked substantially instantaneously to avoid overtravel.

The output shaft of the motor 196b is provided with a pinion gear 410 acting through a reduction gear train identified generally by the numeral 412 to drive the large gear 414. The large gear 414 is provided with a crank pin 416 having a roller sleeve 418 thereon. This roller sleeve is received in a longitudinally elongated slot 420 in an operating lever 422.

The post 328 on which the support retaining spring 326 is mounted previously has been referred to. The spring is mounted on a relatively wide flange portion of the post, and directly beneath the relatively wide flange portion there is provided a washer 424 (Fig. 24). A bushing 426 fits over the post below the washer and is provided with a circumferential flange or head 428 at its lower end. A washer 430 is positioned below the flange or head 428, and a screw 432 threaded into a tapped axial aperture in the post or stud 328 retains the washers and bushing 426 on the stud.

The actuating arm 234b (Figs. 18 and 24) is provided at the end opposite the apertures 286 and 288 with an aperture 434 pivotally fitting over the bushing 426. The arm 234b includes an area in the vicinity of the aperture 434 which is offset upwardly from the remainder of the arm, the upwardly offset area hereinafter being identified by the numeral 436. A plurality of depressions 438 is struck downwardly in the upwardly offset area, and one of these depressions is positioned in an outwardly extending heel 440, there being three symmetrically spaced depressions in the illustrative example.

The operating or actuating lever 422 is provided at the end opposite the slot 420 with an aperture 442, also fitting over the bushing 426. Protuberances 444 are struck down from the lever 422, one of them being formed in an outwardly projecting heel 446, and these protuberances are designed to fit into the depressions 438 in the actuating arm.

The actuating arm and operating or actuating lever are formed as a subassembly. More specifically, the actuating arm 234b fits over the bushing 426 and rests against the enlarged head or flange 428 thereon. The operating or actuating lever 422 also fits over the bushing and is held against the arm 234b by means of a conical coil spring 448 bearing against the top of the lever 422 and held down by a washer 450 mounted at the top of the bushing and held in place by swaging the top of the bushing outwardly as at 452. It will be observed in Fig. 24 that the projections 444 and depressions 438 have inclined side surfaces. Thus, although the spring 448 tends to hold the projections in the depressions, relatively opposite rotative forces on the actuating arm 234b and the operating or actuating lever 422 will cause the projections to cam out of the depressions, the lever 422 moving up against the force of the spring 448.

Thus, when the bushing 426 and associated parts are mounted on the post 328 by the screw and washers as heretofore described, the actuating arm may be stalled, while the motor may continue to run without damage to the motor. Such stalling will occur if a slide should become jammed, or when the end of a magazine is reached and the slide changing member 102b engages the end of the magazine rather than a slide carrier. By the same token, if it is for any reason desired to operate the changer manually it is unnecessary to disconnect the automatic mechanism therefrom. The finger piece 98b is grasped and operated manually in the normal manner, the actuating arm 234b simply breaking loose from the lever 422 by virtue of the slip clutch connection formed by the spring and the complementary projections and depressions.

The automatic operating unit further comprises a switch 454 best seen in Figs. 21 and 23. The switch is mounted on the end wall 392 by means of an angle bracket 456, and includes an insulating base or mounting block 458. A pair of fixed switch arms 460 and 462 is carried in spaced relation by the insulating block 458, and these arms are respectively provided with contacts 464 and 466 which confront each other in spaced apart relation. A flexible switch arm or blade 468 is mounted midway between the fixed arms 460 and 462 and is provided on its opposite faces with contacts 470. The insulating block 458 also carries a flexible switch operating arm 472 of generally L-shape and having a reversely bent tip 474. A C-shaped toggle spring 476 is compressed between the tip 474 and the free end of the arm 468.

This spring normally holds the central arm 468 with one of the contacts 470 in engagement with the contact 466. However, a fiber block 478 is engageable by the heel 446 of the actuating lever upon movement of this lever, and pivots or flexes the arm 472 in a counterclockwise direction to snap the switch contacts 470 from the contact 466 into engagement with the contact 464, the sequence of movement being from Fig. 23 to Fig. 21. When the motor has run long enough to carry the actuating arm 234b and lever 422 through a complete cycle, the heel 446 leaves the block 478, and the switch returns to its normal position as shown in Fig. 23.

The automatic operating unit is provided with a line cord 264b which preferably enters the housing through a rubber grommet 478. A four point female receptacle or connector 480 is provided in the housing, and a male plug or connector 482 is detachably associated therewith. A double wire 288b extends from the plug 482 to a remote push button switch (not shown).

The electrical connections for the automatic operating mechanism are shown in Fig. 20. The flexible lead wires 264b are internally connected to a pair of the contacts of the female connector 480. These contacts are for providing power to a relay or control mechanism or the like for operating the device from a tape recorder or the like. Furthermore, one of the wires 264b is directly connected by a wire 484 to the motor 196b. A wire 486 leads from the other side of the motor to the switch arm carrying the contact 464. Another wire 488 leads from this switch arm to another of the contacts of the female connector 480.

The other of the wires 264b is connected by means of a wire 490 to the flexible switch arm 468 carrying the contacts 470. The third switch arm carrying the contact 466 is connected by means of a wire 492 to the fourth contact of the female connector 480. The wires 288b are connected by means of the male and female connectors to the wires 488 and 492, and the push button 290b is arranged momentarily to connect the two wires 288b when the push button is depressed and held down.

It will be observed that in the quiescent condition of the automatic operating device there is not a complete circuit through the motor. However, when the push button is depressed, a connection is made between the wires 264b through the wire 484, the motor, the wire 286, the wire 488, the connector and plug and the wires 288b, the wire 292, the switch contacts 466 and 470, and the wire 490. The motor then starts to run and the switch arm 468 is moved to carry the contact 470 into engagement with the contact 464, the contact 466 simultaneously being vacated. A direct circuit for the motor thus is established through the wire 284, the motor, the wire 286, the switch contacts 464 and 470, and the wire 490. The push button then can be released, and the motor will run until the heel 446 of the lever 422 engages the fiber block 478 to return the switch to its initial position, thus breaking the circuit for the motor. The construction of the motor including the friction washer or disc prevents coasting or overtravel of the motor as will be appreciated.

It will be noted that the disconnectable or slipping drive connection between the operating or actuating lever and the actuating arm is more or less in the nature of an overrunning clutch, since once the parts have been disconnected there is substantially no driving force between them. This is of considerable importance in that it prevents constant pressure from being imposed on some part that might be damaged.

It now will be apparent that the apparatus or mechanism herein disclosed is capable of automatically projecting slides in substantially any conventional slide projector, thereby rendering it unnecessary to replace existing slide projectors for automatic projection. The slides are moved to and from their prearranged positions in a magazine so that no manual handling of the slides is necessary except for initial loading of the magazine. The magazines are replaceable, and hence the slides can be stored indefinitely in the magazines at small expense, and conventional slide files can be dispensed with if desired. The semiautomatic part of the apparatus or mechanism is known to the art, but the automatic operation thereof is new and further represents utilization rather than replacement of existing equipment. The particular automatic operating mechanism, including the rotary motor, the reducing mechanism, and the wigwag mechanism all represent elements that are freely available in commerce or can be fabricated at a low price.

Accordingly, the invention herein shown and described renders automatic operation, either under the control of an operator or of a record commentary, available to amateur photographers, teachers, and others with a minimum outlay of capital.

The particular embodiments of the invention herein shown and described will be understood as being for illustrative purposes. Various structural changes will doubtless occur to those skilled in the art and form a part of this invention insofar as they fall within the spirit and scope of the appended claims.

I claim:

1. Mechanism for the automatic projection of slides in conjunction with a slide projector and a manual slide changer of the type comprising a horizontal base plate extending longitudinally of said projector and a manually engageable horizontally disposed slide changing member horizontally reciprocable transversely of said projector, comprising base means adapted to be supported below said manual slide changer, bracket means on said base engageable with said base plate for securing said mechanism in depending relation from said base plate, an oscillatable actuator supported from said base means and extending horizontally beyond said base means, an operating member, overrunning clutch means connecting said operating member to said actuator, a motor supported from said base means, drive connection means for oscillating said operating member and hence said actuator from said motor, and means on said actuator detachably interfitting with said manually engageable slide changing member for reciprocating said member or oscillation of said actuator.

2. Mechanism as set forth in claim 1 wherein the motor comprises a rotary motor, and wherein the drive connection means includes a pin-slot connection between said motor and said operating member.

3. Mechanism for the automatic projection of slides in conjunction with a slide projector and a manual slide changer of the type comprising a horizontal base plate extending longitudinally of said projector with a free front edge and a manually engageable horizontally disposed slide changing member horizontally reciprocable transversely of said projector, comprising base means adapted to be supported below said manual slide changer, bracket means on said base having upstanding flange means adapted to be positioned adjacent said free front edge and horizontal flange means on said upstanding flange means adapted to overlie and engage the top of said base plate adjacent said front edge, said mechanism thereby depending from said base means and extending horizontally beyond said base means, a motor supported from said base means, drive connection means for horizontally oscillating said actuator from said motor, and means on said motor detachably interfitting with said manually engageable slide changing member for reciprocating said member upon oscillation of said actuator and comprising a member adapted to be juxtaposed against said actuator, and clip means cooperatively engaging said juxtaposed member and said manually engageble slide changing member for holding the same in engagement.

4. Mechanism as set forth in claim 3 wherein the detachably interfitting means further includes a link pivotally connected to said juxtaposed member and having a detachable pin and aperture pivotal connection with said oscillatable actuator, said link having spring means thereon resiliently holding said link in pivotal engagement with said actuator.

5. Mechanism for the automatic projection of slides in conjunction with a slide projector and manual slide changer of the type comprising a horizontal base plate extending longitudinally of said projector with a free front edge and a manually engageable horizontally disposed slide changing member horizontally reciprocable transversely of said projector, comprising base means adapted to be supported below said manual slide changer, bracket means on said base having upstanding flange means adapted to be positioned adjacent said free front edge and horizontal flange means on said upstanding flange means adapted to overlie and engage the top of said base plate adjacent said front edge, said mechanism thereby depending from said base plate, an oscillatable actuator supported from said base means and extending horizontally beyond said base means, a motor supported from said base means, drive connection means for horizontally oscillating said actuator from said motor, means on said actuator detachably interfitting with said manually engageable slide changing member for reciprocating said member upon oscillation of said actuator, and a leg projecting downwardly from said base means, said base means having means thereon adjustably securing said leg in depending position for engaging a supporting surface to aid in supporting said mechanism.

6. Mechanism for the automatic projection of slides in conjunction with a slide projector and manual slide changer of the type comprising a horizontal base plate extending longitudinally of said projector with a free front edge and a manually engageable horizontally disposed slide changing member horizontally reciprocable transversely of said projector, comprising base means adapted to be supported below said manual slide changer, bracket means on said base having upstanding flange means adapted to be positioned adjacent said free front edge and horizontal flange means on said upstanding flange means adapted to overlie and engage the top of said base plate adjacent said front edge, said mechanism thereby depending from said base plate, an oscillatable actuator supported from said base means and extending horizontally beyond said base means, a motor supported from said base means, drive connection means for horizontally oscillating said actuator from said motor, means on said actuator detachably interfitting with said manually engageable slide changing member for reciprocating said member upon oscillation of said actuator, a rod projecting downwardly from said base means for engaging a supporting surface to aid in supporting said mechanism, and adjustable securing means on said base means comprising a leaf spring member having an aperture therein receiving said rod, said leaf spring member in the vicinity of said aperture obliquely traversing said rod for wedging said rod into position, said leaf spring member having manually engageable means thereon for flexing said leaf spring member for loosening said rod for longitudinal adjustment thereof.

7. Mechanism for the automatic projection of slides in conjunction with a slide projector and a manual slide changer of the type comprising a horizontal base plate extending longitudinally of said projector with a free front edge, an adjacent free longitudinal edge having an upstanding flange thereon, and an opposite longitudinal edge, and further comprising a manually engageable horizontally disposed slide changing member horizontally reciprocable transversely of said projector, comprising base means adapted to be supported below said manual slide changer, bracket means on said base means having an upstanding flange adapted to be positioned adjacent said free front edge and parallel thereto, said bracket further having an upstanding flange at right angles to the first mentioned upstanding flange and adapted to be positioned adjacent the free longitudinal edge having the upstanding flange thereon, the upstanding bracket flanges having flanges along their upper edges adapted to overlie and engage the top of the base plate adjacent the free front edge and the first mentioned longitudinal edge, the upstanding flange of the bracket adjacent the first mentioned free longitudinal edge of the base means being reentrant for embracing the upstanding flange of the base plate, said bracket further including an upstanding flange engageable with the opposite longitudinal edge of the base plate for positioning of the mechanism, an oscillatable actuator supported from said base means and extending horizontally beyond said base means, a motor supported from said base means, drive connection means for oscillating said actuator from said motor, and means on said actuator detachably interfitting with the changing member for reciprocating said member upon oscillation of said actuator.

References Cited in the file of this patent

UNITED STATES PATENTS

| | | |
|---|---|---|
| 1,950,047 | Contal | Mar. 6, 1934 |
| 2,260,660 | Darwin | Oct. 28, 1941 |
| 2,427,164 | Stechbart | Sept. 9, 1947 |
| 2,503,239 | Antos | Apr. 11, 1950 |
| 2,549,289 | Cadwell et al. | Apr. 17, 1951 |
| 2,590,492 | Bennett et al. | Mar. 25, 1952 |
| 2,711,602 | Wiklund | June 28, 1955 |
| 2,724,989 | Badalich | Nov. 29, 1955 |
| 2,748,653 | Pollan et al. | June 5, 1956 |
| 2,756,630 | Goldberg | July 31, 1956 |
| 2,784,817 | Lessman | Mar. 12, 1957 |
| 2,787,669 | Flan et al. | Apr. 2, 1957 |